US011693641B1

(12) United States Patent
G Rao et al.

(10) Patent No.: US 11,693,641 B1
(45) Date of Patent: Jul. 4, 2023

(54) MACHINE LEARNING (ML) POWERED PROGRAMMING CODE TRANSFORMATIONS

(71) Applicant: ACCENTURE GLOBAL SOLUTIONS LIMITED, Dublin (IE)

(72) Inventors: Srikanth G Rao, Bangalore (IN); Arunabh Sinha, Patna (IN); Mathangi Sandilya, Bangalore (IN); Nitima Singhal, Faridabad (IN); Anup Kumar Tiwary, Bangalore (IN); Anand Vijendra, Bangalore (IN)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 0 days.

(21) Appl. No.: 17/701,417

(22) Filed: Mar. 22, 2022

(51) Int. Cl.
*G06F 9/44* (2018.01)
*G06F 8/41* (2018.01)
*G06N 20/10* (2019.01)
*G06F 8/51* (2018.01)

(52) U.S. Cl.
CPC ............ *G06F 8/447* (2013.01); *G06F 8/4441* (2013.01); *G06F 8/51* (2013.01); *G06N 20/10* (2019.01)

(58) Field of Classification Search
None
See application file for complete search history.

(56) References Cited

U.S. PATENT DOCUMENTS

| 9,454,732 | B1* | 9/2016 | Garton | G06N 20/00 |
| 2008/0270974 | A1* | 10/2008 | Topchiyski | G06F 8/61 717/104 |
| 2012/0060148 | A1* | 3/2012 | Jones | G06F 8/51 717/120 |
| 2019/0108001 | A1* | 4/2019 | Hauser | G06F 8/30 |
| 2021/0357192 | A1* | 11/2021 | Deng | G06F 8/447 |
| 2022/0236964 | A1* | 7/2022 | Bahrami | G06F 8/36 |
| 2022/0236971 | A1* | 7/2022 | Zhang | G06F 8/447 |

* cited by examiner

*Primary Examiner* — Qamrun Nahar
(74) *Attorney, Agent, or Firm* — Mannava & Kang, P.C.

(57) ABSTRACT

A machine learning (ML) based code transformation system that transforms a source programming code developed using a source library for execution on a source platform into remediated code for execution on a target platform is disclosed. Metadata extracted from the source programming code is used to detect the source programming language, source libraries, and the source platform. The metadata also enables modularizing the source programming code based on the functionality and identifying a node from a plurality of nodes in a communication network to execute the various source code modules. A similarity map is generated mapping the source libraries to the target libraries and the source code modules that are incompatible with the target platform are identified and remediated with similar target code modules using the similarity map.

20 Claims, 12 Drawing Sheets

| # | Attributes | Description | Weightage |
|---|---|---|---|
| 1 | Presence of import statement | Referencing external libraries | W1 |
| 2 | Presence of include statement | Referencing external libraries | W2 |
| 3 | Presence of class definition | Defining class -- with class keyword, | W3 |
| 4 | Presence of Object creation via 'new' operator | Initialising objects and variables | W4 |
| 5 | Variable declaration | Requirement of prior declaration and initialization of variables before using | W5 |
| 6 | Function declaration | Declaring Functions with and without return types | W6 |
| 7 | Function names | SDK function names from the specific library | W7 |
| 8 | Parameters to functions | Parameters with type declaration, auto detection | W8 |
| 9 | Default and named parameters to functions | Positional and named parameters | W9 |
| 10 | Return values from function | Data returned by the function of return type, generic type, single or multiple return values | W10 |
| 11 | For loop syntax | Various forms of for loop statements | W11 |
| 12 | While loop syntax | Various forms of while loop statements | W12 |
| 13 | Exception handing | Try / catch blocks, exception handler | W13 |
| 14 | Conditional statement syntax | Various types of conditional flow -- single line conditions, multi-line conditions | W14 |
| 15 | Library documentation | SDK or Library documentation describing the functionality | |

250

252 — brace covering rows 1–4
254 — brace covering rows 5–14
256 — row 15

Parameters (language syntax, keywords, language specific functions...)

| | import statement | include statement | object creation (new) | object defn (class) | loop construct | condition construct | var declaration | language keywords | ... |
|---|---|---|---|---|---|---|---|---|---|
| Examples | 1 | 0 | 1 | 1 | | | 0 | | |
| | 0 | 1 | 1 | 1 | | | 1 | | |
| | 0 | 1 | 0 | 0 | | | 1 | | |
| | 1 | 0 | 1 | 1 | | | 1 | | |

| 312 | | 362 | | 314 |
|---|---|---|---|---|
| S# | Clusters | Category | Description | Node Recommendation |
| 1 | Chat | In-game | Communication channels in-game | Cloud |
| | | External Integration | Integration with Slack, Discord etc | |
| 2 | Store/Virtual Goods | In-game | Ingame stores | Cloud |
| | | Auction/Marketplaces | Player run marketplaces in game | |
| | | External Integration | Purchase from publisher sites | |
| 3 | Audio | EAX | Digital signal processing presets | Audio processing on Cloud / Edge node |
| | | OpenAL | Cross Platform Audio API | Playback on Client device |
| 4 | User Input | User Actions | Manage User Inputs & Actions | Client Device |
| 5 | Video | Renderer - OpenGL, Direct3D | Generating images from 3D models | Cloud / Edge Node |
| | | Animation | Motion graphics | |
| | | Effects | Visual/Special effects | |
| 6 | User Setting | Controls | Key Bindings | Client device |
| | | Preferences | Audio & Graphics settings, Performance | |
| 7 | Gamefiles | Data | Game Saves, Config | Cloud |
| | | Assets | Language, Sound, Text, Textures | |
| 8 | Game Engine | Game logic/algorithm | Game mechanics & rules | Cloud / Edge Node |
| | | Objects | Distinct elements in game - ambient objects, weapons, torch | |
| | | Entities | Interactable elements in game - characters, events | |

MACHINE LEARNING (ML) POWERED PROGRAMMING CODE TRANSFORMATIONS

BACKGROUND

Program or code transformation is the process of formally changing a program to a different program with the same semantics as the original program. This process can be implemented using sets of individual program transformations, which are bits of knowledge that map substructures in one formal system e.g., programming language to another formal system. A programming language has a structure and meaning or semantics of the language. Program transformations need to alter the programming code into the target library and/or language while preserving the functionality of the source code.

BRIEF DESCRIPTION OF DRAWINGS

Features of the present disclosure are illustrated by way of examples shown in the following figures. In the following figures, like numerals indicate like elements, in which:

FIG. 2B shows a listing of attributes and parameters that can be extracted by the metadata provider in accordance with the examples disclosed herein.

FIG. 3C shows a table of various clusters that can be created in accordance with the examples disclosed herein.

DETAILED DESCRIPTION

Figure 1:
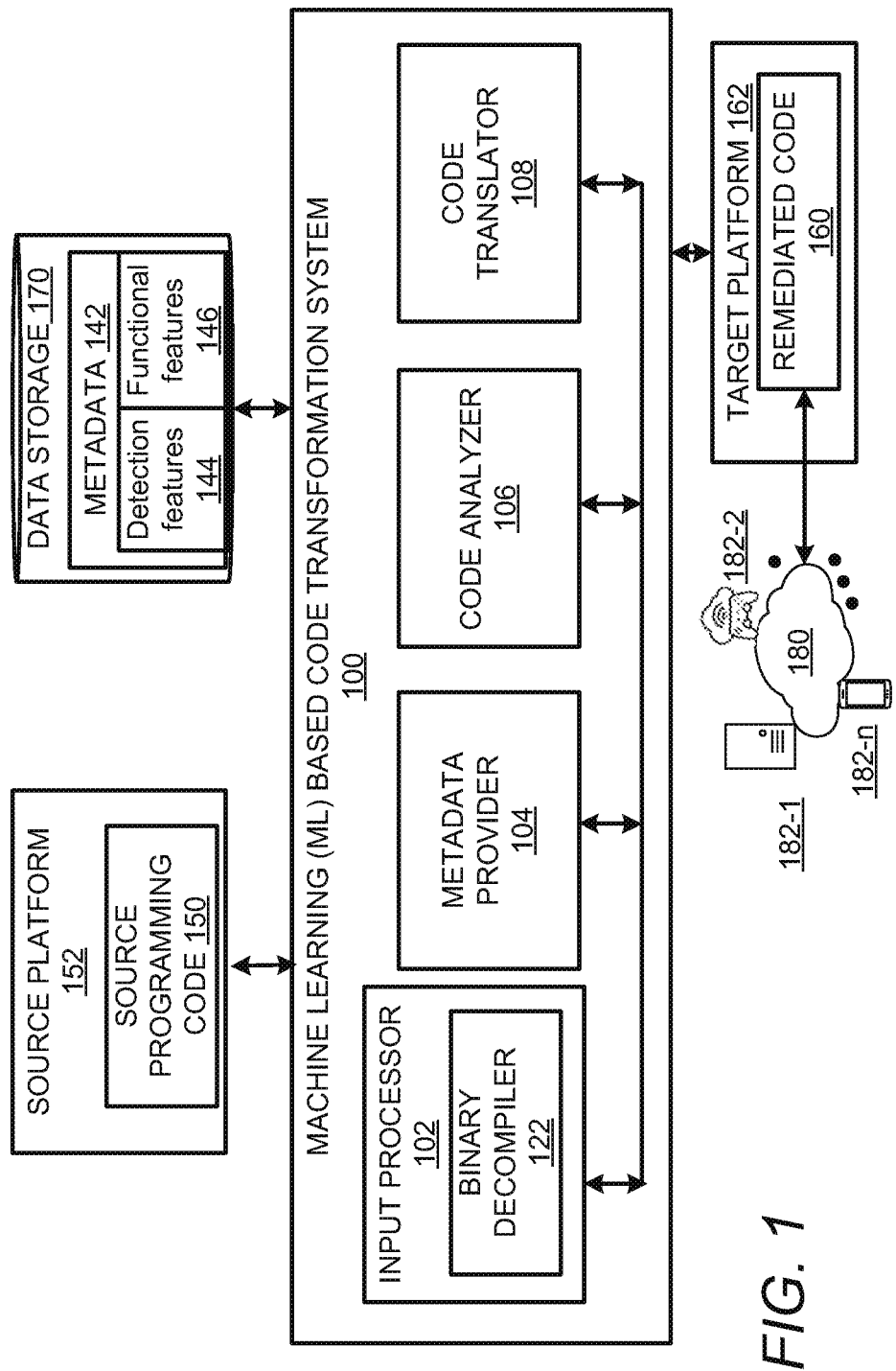
FIG. 1 shows a block diagram of a Machine Learning (ML) based Code Transformation System in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

An ML-based code transformation system transforms a source programming code encoded for a source platform into remediated code for a target platform using various ML models. Metadata pertaining to different programming constructs is extracted from the source programming code using natural language tool kit (NLTK) techniques. By way of illustration but not limitation, the metadata can be extracted at three levels, namely, line metadata, function metadata, and file metadata. This metadata can be grouped into two categories—detection features and functional features. The metadata is used to determine the source language and the source platform for which the source programming code was developed. Additionally, different nodes are selected from a plurality of nodes in a communication network for the different source code modules based on the functionality. The source code models which are incompatible with the target platform are identified and remediated with target code modules that can be implemented on the target platform. The target code modules can be ported to different selected nodes of the communication network. In an example, the target code modules can be in the same programming language as the source code modules.

The language of the source programming code i.e., the source language and the target language of the remediated code can be of any type of programming language. The source language and the source platform are identified using different ML models that can be trained on labeled data via supervised training techniques. The parameters to be used for the various ML models are obtained from the extracted metadata. The parameters can include the detection features and the functional features. The detection features can include language-specific keywords, variables, loops and conditions, declarations, line terminations, function beginnings and endings, initializations, declarations, etc., that enable automatic detection of the source language/library by a language detection ML model. The source platform for which the source programming code was developed can be detected by providing the detection features to a platform detection ML model. In an example, a subset of the detection features may be provided to the language detection ML model, while another subset of the detection features can be provided for library detection and yet another subset of the detection features can be provided to the platform detection ML model. There may be overlaps between the subsets provided to the ML models for language, library, and platform detection. In an example, the language detection of the source programming code may be an inherent part of the library detection.

In an example, the library detection ML model, the language detection model, and the platform detection model can implement multiple deep learning (DL) models such as but not limited to, support vector machines (SVMs), logistic regression, etc., can be used for classifying the source programming code into a corresponding source language, a source library, and source platform. In an example, the language detection ML model can be trained via supervised learning with explicitly labeled training data that can include an identifier of the source language and line metadata, function metadata, and the file metadata of the source language. Similarly, the platform detection ML model may be trained via supervised learning with explicitly labeled training data that can include an identifier of the source platform and line metadata, function metadata, and the file metadata of the source programming code.

The functional features enable automatic detection of the functions of different source code modules in the source programming code. In an example, the functional features can be extracted from comments in the source programming code. The different source code modules can be clustered/grouped based on the functional features. In an example, K means clustering algorithm can be used to group the source code modules under the specific features/functionality. The clusters can be provided to a node recommender model to obtain recommendations for the corresponding node from a plurality of nodes of a communication network for implementing the source code modules. In an example, the plurality of nodes can include, client devices, cloud servers, edge nodes, etc. The node recommender model can implement deep learning (DL) techniques and maybe be trained using labeled data which can include different code modules labeled with corresponding nodes of the communication network where the different code modules are to be implemented. Thus, the execution of the source code modules (and hence the remediated code) can be optimized.

To generate the remediated code in the target language, a similarity map is initially generated. The similarity map, therefore, provides mappings of the source functions from the source documentation e.g., the source Software Development Kit (SDK)/libraries to the target functions from the target documentation e.g., the target SDK and libraries. The mappings are based on similarities of the corresponding functions. In an example, the content from the libraries and the SDK can be treated as textual content and represented as vectors which are mapped into the similarity map using distance measures such as but not limited to cosine distance so that similar functions are closer as compared to dissimilar functions. The functionality of the various source code modules can be determined based on, for example, the comments in the source code. Furthermore, the source code modules that are incompatible with the target platform are identified. Using the similarity map, the target functions that are similar or implement similar functionality as the incompatible source code modules can be identified. The remediated code is generated by replacing the incompatible source code modules within the similar target code modules identified from the similarity map. The remediated code thus generated can be ported to the various nodes of the communication network in accordance with the recommendations are obtained from the node recommender model. Therefore, a target code module replacing a source code module would be hosted or ported to the network node that was originally recommended for the source code module.

While the issues below are discussed with respect to cloud-based video game platforms, it can be appreciated that the code transformation systems and processes described herein apply to the transformations of other applications. Currently, all video games are either built for traditional gaming (with an On-Prem tech stack) or cloud gaming separately as they use different tech stacks for gaming logic, rendering, and other functions. Cloud Gaming Platforms have two ways ahead to create cloud-ready games. Firstly, cloud-ready games can be created by setting up game development studios to create new cloud-native games. Another way to create cloud-ready games is to port existing games to other platforms. However, even the latter option can be challenging. This is because existing games are created to run on specific platforms like PC (Windows/Linux), Consoles (Xbox/Playstation/Nintendo), Mobile/Tablet each with its unique frameworks and libraries. Apart from Unity® and Unreal® which are well-adopted game engines, most popular games use purpose-built game engines to deliver their desired game experiences, resulting in heterogenous game architecture. Each hardware stack impacts game performance, integrations, and feature availability. For developers looking to migrate their existing games from traditional models to Cloud Gaming, the game engine frameworks (Unity®, Unreal® engine, etc.) should be supported by the chosen cloud gaming providers. If not, then developers wanting to migrate will have to develop the game from scratch. From the hardware perspective, game developers need to consider the hardware capabilities and limitations provided by Cloud Game providers to ensure optimal performance. In order to optimally make use of the features provided by cloud gaming services such as chatting with players, pausing and resuming game state, session management, etc. or interacting with cloud-native services, developers will need to make use of Cloud game ecosystem provider Software Development Kits (SDK)/Application Programming Interfaces (APIs) and make changes to existing games for migrating them to the cloud servers.

The code transformation system described herein is configured to analyze existing source code and translate it to be compatible with targeted gaming platforms and dynamically run game modules on the most suitable 5G nodes to deliver the desired game experience to users. The code transformation system analyses games' source code built for different platforms and identifies frameworks & libraries used to transform the source code into remediated code to run on the target platform's hardware stack & capabilities. It modularizes the various features and identifies modules critical to delivering high performance/low latency experience and intelligently decides the 5G node to deploy it on. Various features in games such as—Notifications, Messaging, Purchasing, Leaderboard, User Management should be modularized and decoupled from core game logic—enabling developers to easily migrate those modules to cloud-native/edge computing nodes. Thus, not only does the code transformation system improve the efficiency of systems for developing newer applications such as newer games but also improves the performance of the newer applications by identifying the network nodes to host the various code modules based on their functionalities.

FIG. 1 shows a block diagram of the ML-based Code Transformation System 100 in accordance with the examples disclosed herein. The system 100 accesses source programming package 150 developed in a source language for execution on a source platform 152 and transforms or translates the source programming code 150 into remediated code 160 which is encoded in a target language and capable of being executed by a target platform 162. In some examples, the source language and the source platform 152 may be similar to the target language i.e., the source programming code 150 may be transformed in the same source language to a different target platform. Specific examples are discussed herein for code transformations for computer gaming systems/platforms. However, it can be appreciated that similar code transformation techniques can be applied to other programming code executed by systems including financial software, healthcare packages, e-commerce applications, etc. By way of illustration and not limitation, for gaming systems, the source language and the target language can include C, C++, Python, Java, etc. while the source platform 152 and the target platform 162 can include a Personal Computer (PC) based executable on various operating systems such as (Windows, Linux, Mac, etc.), specialized gaming hardware such as but not limited to X-box, Playstation, Nintendo, mobile devices executable on mobile operating systems such as Android, iOS, etc. Furthermore, for game applications, the system 100 can be further configured to identify programming code modules that are critical to delivering high-performance/low latency experiences expected by the users and identifying an appropriate node from a plurality of nodes 182-1, 182-2 . . . , 182-n, in a communication network 180 for hosting the programming code module(s).

The system 100 includes input processor 102, metadata provider 104, code analyzer 106, and code translator 108. The input processor 102 accesses and analyzes the source programming package 150 to determine if the source programming code 150 can be received in an executable or as a binary code. If the source programming code 150 is received in an executable, then the input processor 102 provides the executable to a binary decompiler 122 for extraction of the source programming code 150. If however, the source programming code is directly accessible, then the source programming package 150 may be provided to the metadata provider 104 without further processing. The source programming code 150 so obtained can be stored in a code repository (not shown) which may be included within the data storage 170 that can be accessed by the system 100.

The metadata provider 104 accesses the source programming code 150 for extraction of the metadata 142. The metadata 142 includes detection features 144 and functional features 146. The detection features 144 enable automatic detection of the source language and the source platform 152. The functional features 146 enable automatic detection of functions of different source code modules included in the source programming code 150. Referring to the examples for gaming software, different games can be developed for different hardware platforms. Accordingly, the source programming package 150 can vary in length, syntax, and logic. If the source programming package 150 is to be remediated for the target platform 160, every source code file needs to be reviewed to identify the libraries that are employed, the naming conventions used, track the flow of logic, etc. Such attributes can form the detection features 144 while the features associated with the functionality form the functional features 146. Referring to the example of a gaming application, the functional features 146 can include but are not limited to, game rendering, game states, player groups, notifications, payments, etc.

Understanding the source programming code 150 is the first step to porting the source programming code across platforms as it is not beneficial to port vast source files that are incompatible across platforms or libraries. ML techniques are implemented in conjunction with the detection features 144 by the code analyzer 106 for mapping the source and the target platforms. Once the source language and the source platform 152 are identified, the functional features 146 can be employed to identify and cluster modules within the source programming code 150 based on their different functions. Referring to the example of game code, the code analyzer 106 can be configured to identify code modules in a game programming code that are critical for smooth gaming experience such as scene renderers, input management, real-time sync, etc., and identify a network node that a particular code module should run on based on performance and latency requirements. Accordingly, the code analyzer 106 can recommend a corresponding node of the plurality of nodes 182-1, 182-2 . . . , 182-n, for executing the different portions of the source programming code 150 associated with different functions. In an example, the communication network 180 can include the internet and the plurality of nodes 182-1, 182-2, . . . , 182-n, can include cloud servers, mobile devices, such as but not limited to smartphones, tablets, smartwatches, head-mounted display (HMD) devices and computing devices such as PCs, laptops, etc. The code analyzer 106 can decouple/modularize various features in the games such as notifications, messages, in-game purchases, leaderboard, user management from the core programming logic for easy migration of such modules to cloud-native/edge computing nodes.

The code translator 108 analyzes the different source code modules within the source programming code 150 to identify the source code modules that may be incompatible with the target platform 162. The incompatible source code modules can be replaced with target code modules executable on the target platform 162 for carrying out similar functions as the source code modules. The code translator 108 can implement automated ML-based mechanisms to translate the source code modules to generate remediated code 160 for execution on the target platform 162. Referring again to the example of game programming code, the system 100 can modify the game libraries/frameworks and game engine elements to make the gaming software ready for the target cloud and transform the code to a cloud-native format depending on the targeted cloud platform's hardware stack and capabilities.

Figure 2A:
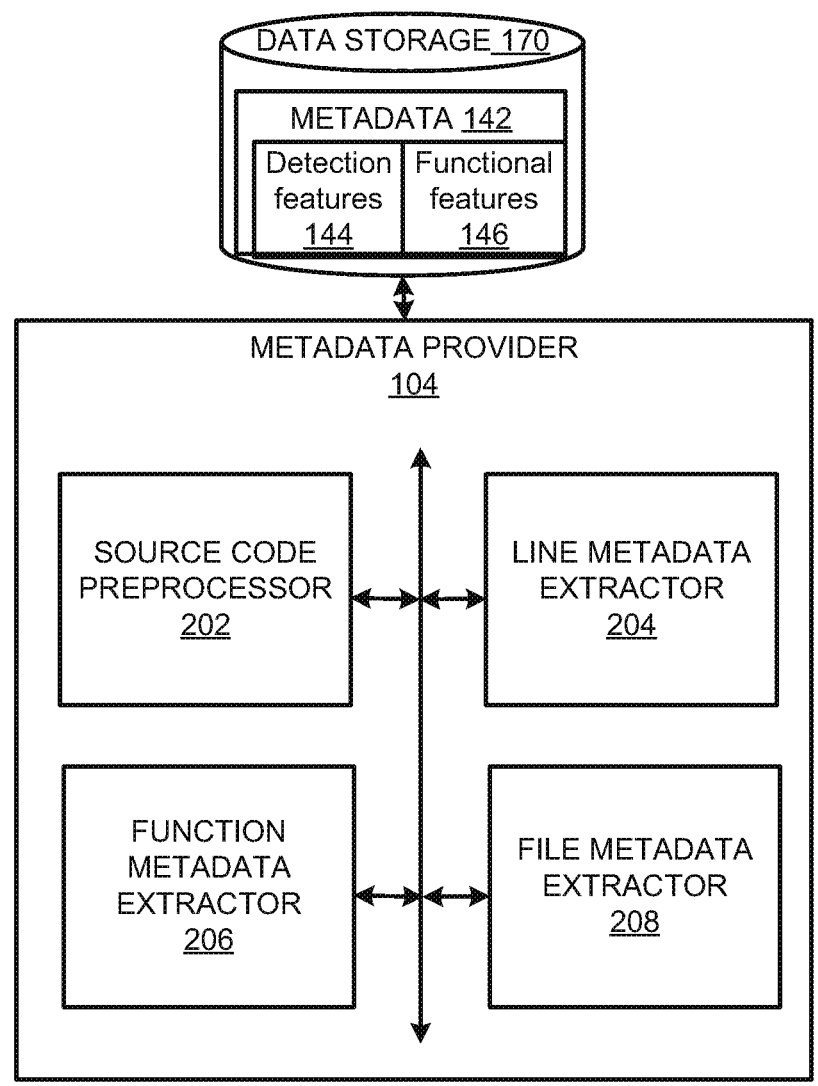
FIG. 2A shows a block diagram of a metadata provider in accordance with the examples disclosed herein.

FIG. 2A shows a block diagram of the metadata provider 104 in accordance with the examples disclosed herein. FIG. 2B shows a listing of attributes and parameters that can be extracted by the metadata provider 104 in accordance with the examples disclosed herein. The description below refers to FIG. 2A and FIG. 2B simultaneously. As mentioned above, the metadata provider 104 is extracted at different levels including line, function, and file levels which is then categorized as the detection features 144 and the functional features 146. Some of the features may be common to the detection features 144 and the functional features 146. The metadata provider 104 includes a source code preprocessor 202, a line metadata extractor 204, a function metadata extractor 206, and a file metadata extractor 208. The source programming code 150 from the input processor 102 is accessed by the metadata provider 104 for the detection of the library and programming language used in the source code and for extraction of the metadata 142 of the lines, functions, and the files included in the source programming code 150. In an example, the source programming code 150 may be treated as textual content and natural language tool kit (NLTK) techniques can be applied to identify the type of source programming language and to extract the metadata 142. The metadata provider 104 preprocesses the metadata 142 to generate input parameters for the ML models used downstream for programming language and platform detection.

The source code preprocessor 202 treats the binary or the source programming code 150 as textual data to extract each line of text. Particularly, the source code preprocessor 202 may scan and extract each line of programming code that is provided to the line metadata extractor 204. The line metadata extractor 204 can extract metadata of each line which can include various line attributes 252 such as those displayed in the table 250 along with the corresponding weights given to each attribute. By way of illustration and not limitation, the line metadata can include any special characters at beginning of the line, special characters at the end of the line, keywords, numerical values, etc. For example, attributes including the presence of certain programmatic elements such as but not limited to import statements include statements, source code comments, etc., may be extracted from each of the lines of code as line attributes 252 by the line metadata extractor 204. Similarly, function attributes 254 related to functions in programming code can be identified by the function metadata extractor 206. In an example, the output from the line metadata extractor 204 can be provided to the function metadata extractor 206, e.g., when a line is identified as a function declaration. Again, as mentioned above with respect to various features, the metadata of various elements, such as lines, functions, files, etc., may overlap in some instances. Similarly, file metadata extractor 208 can extract file metadata 256 based on the identification of specific files e.g., library documentation, SDK documentation, etc.

Each of the line metadata extractor 204, function metadata extractor 206, and the file metadata extractor 208 can include a classifier that is trained via one or more supervised and unsupervised methodologies for the metadata identification extraction. When supervised methodologies are used, code snippets with explicit labels can be used to train the classifiers. In an example, such code snippets can be further enhanced with subject matter expert (SME) inputs. The metadata 142 thus gathered is further processed for parameter/feature generation for the various ML models as shown in table 260. In table 260, different lines are identified as import statements, include statements, object creation statements, object definitions, variable declarations, etc., and encoded accordingly. For example, line 262 has a value of '1' under 'include statement' and 'var declaration' which conveys that the specific line is an include statement with a variable declaration. These parameters/features which comprise the detection features 144 and the functional features 146 can be provided to the various ML models which enable language and platform detections.

Figure 3A:
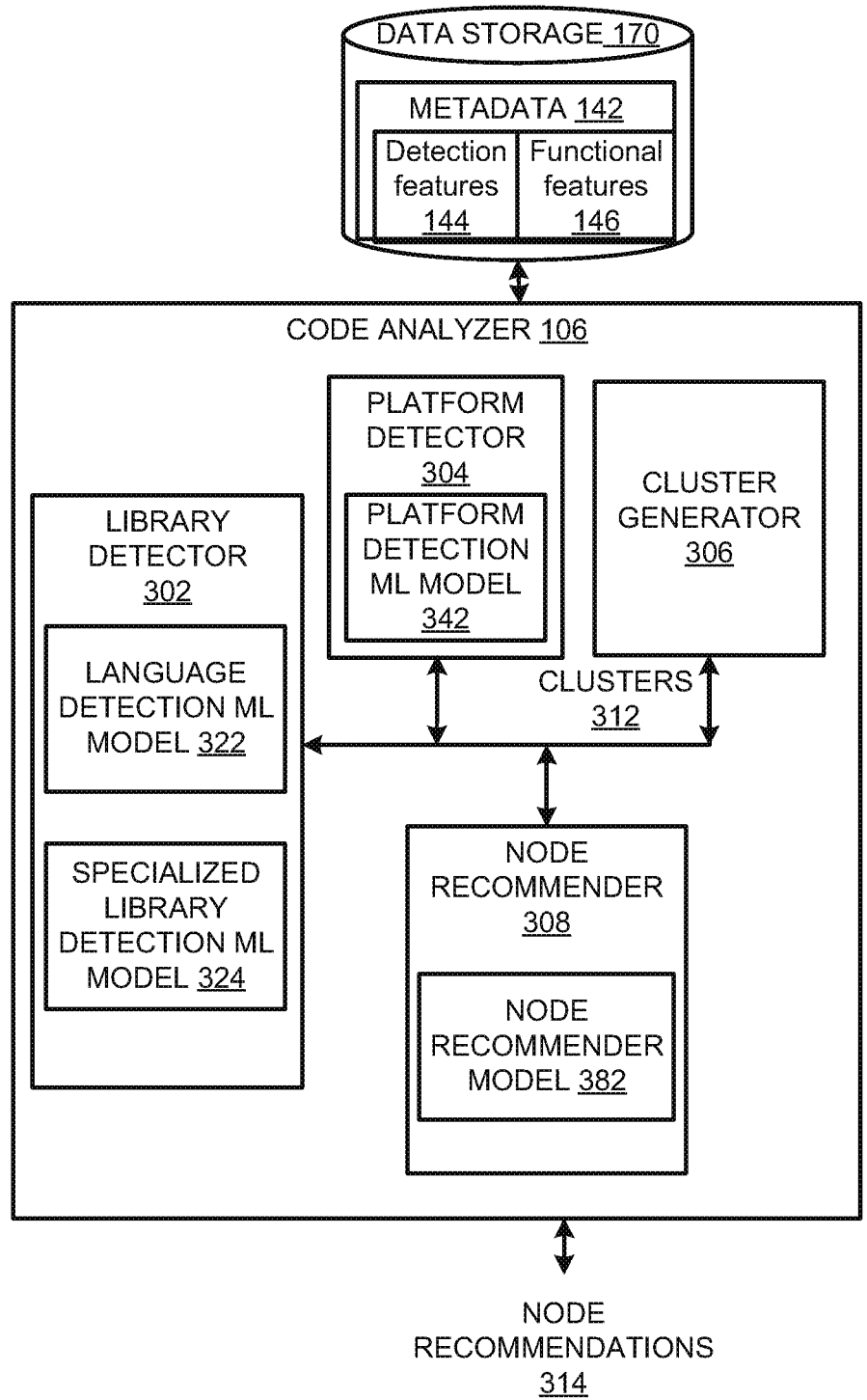
FIG. 3A shows a block diagram of a code analyzer in accordance with the examples disclosed herein.

FIG. 3A shows a block diagram of the code analyzer 106 in accordance with the examples disclosed herein. The code analyzer 106 employs ML techniques with the detection features 144 to identify the source language, source library, and the source platform 152 of the source programming code 150. Libraries may be specific or generic types. Referring to the video game example, the libraries may include game-specific libraries such as but not limited to, Unity engine, Unreal Engine, OpenGL, etc., and generic programming languages or SDK libraries. In the video game example, library detection may involve the identification of game-specific libraries. This may help in determining the compatibility of the source library with the target cloud environment or the need for code remediation for the target platform 162.

The code analyzer 106 may also modularize the source programming code 150 to identify the functionality of different modules. The code analyzer 106 may also access information regarding the various network nodes 182-1, 182-2, . . . 182-n, that are available to execute the remediated code 160. Based on the functionality of different modules of the source programming code 150 and the network nodes, the code analyzer 106 can suggest different network nodes from the plurality of network nodes 182-1, 182-2, . . . 182-n, that provide optimal performance for the execution of the different modules of the source programming code 150.

Accordingly, the code analyzer 106 includes a library detector 302, a platform detector 304, a cluster generator 306, and a node recommender 308. Each of the library detector 302 and the platform detector 304 includes trained ML models i.e., a language detection ML model 322, a specialized library detection ML model 324, and the platform detection ML model 342 for identification of the programming language used, the libraries used in the source programming code 150 and the source platform 152 hosting the source programming code 150. Referring again to the game code, the language detection ML model 322 can be used for the detection of specific programming languages such as C, C++, etc. while the specialized library detection ML model 324 can be used for identification of particular gaming libraries such as Unity, Unreal, etc. The ML models used can include multiclass classification models, such as support vector machines (SVMs), logistic regression, etc. The language detection ML model 322 can be trained via supervised training methodologies or unsupervised training techniques to output confidence scores for the different programming languages. Similarly, the specialized library detection ML model 324 can be trained via supervised training methodologies or unsupervised training techniques to output confidence scores for the different libraries. The detection features 144 can be provided to the language detection ML model 322 and the specialized library detection ML model 324 which are respectively trained for programming language and specialized library identification. In an example, the language detection ML model 322 and the specialized library detection ML model 324 can employ different subsets of the detection features 144 for the language and the library detection. The language detection ML model 322 outputs the programming language associated with the highest confidence score as the programming language of the source programming code 150. The library associated with the highest confidence score can be identified as the library included in the source programming code 150 by the specialized library detection ML model 324. Again, when referring to the video game example, the specialized library detection model ML 324 may identify the game-specific library, i.e., whether the library is associated with gaming engines such as Unreal®, Unity®, etc. Similarly, the platform detector 304 can include the platform detection ML model 342 trained via supervised training techniques or unsupervised training techniques to identify different platforms using the detection features 144. For example, if the source programming code 150 includes game code, the platform detection ML model 342 can be trained to identify different platforms such as but not limited to, Xbox®, Playstation®, Nintendo®, etc. Again, the detection features 144 are provided to the platform detection ML model 342 and the platform associated with the highest confidence score is identified as the source platform 152.

The functional features 146 from the metadata 142 enable clustering different source code modules/source files by the cluster generator 306 per the functionalities associated with the different source code modules. In an example, the cluster generator 306 can implement K-means clustering for generating clusters 312 of source files related to different functionalities. Referring again to the gaming code example, the code modules/files from the source programming code 150 are clustered based on the associated functionalities e.g., different clusters of source code files may be formed from game rendering files, files maintaining game states, files for enabling chats between gamers, files for in-game purchases/messages, etc. The node recommender 308 includes a node recommender model 382 that outputs different node recommendations 314 from the plurality of nodes 182-1, 182-2, . . . , 182-n, to host or execute the corresponding code modules/files. In an example, the node recommender model 382 can be an SVM model trained to recommend specific nodes for particular functions as detailed herein.

Figure 3B:
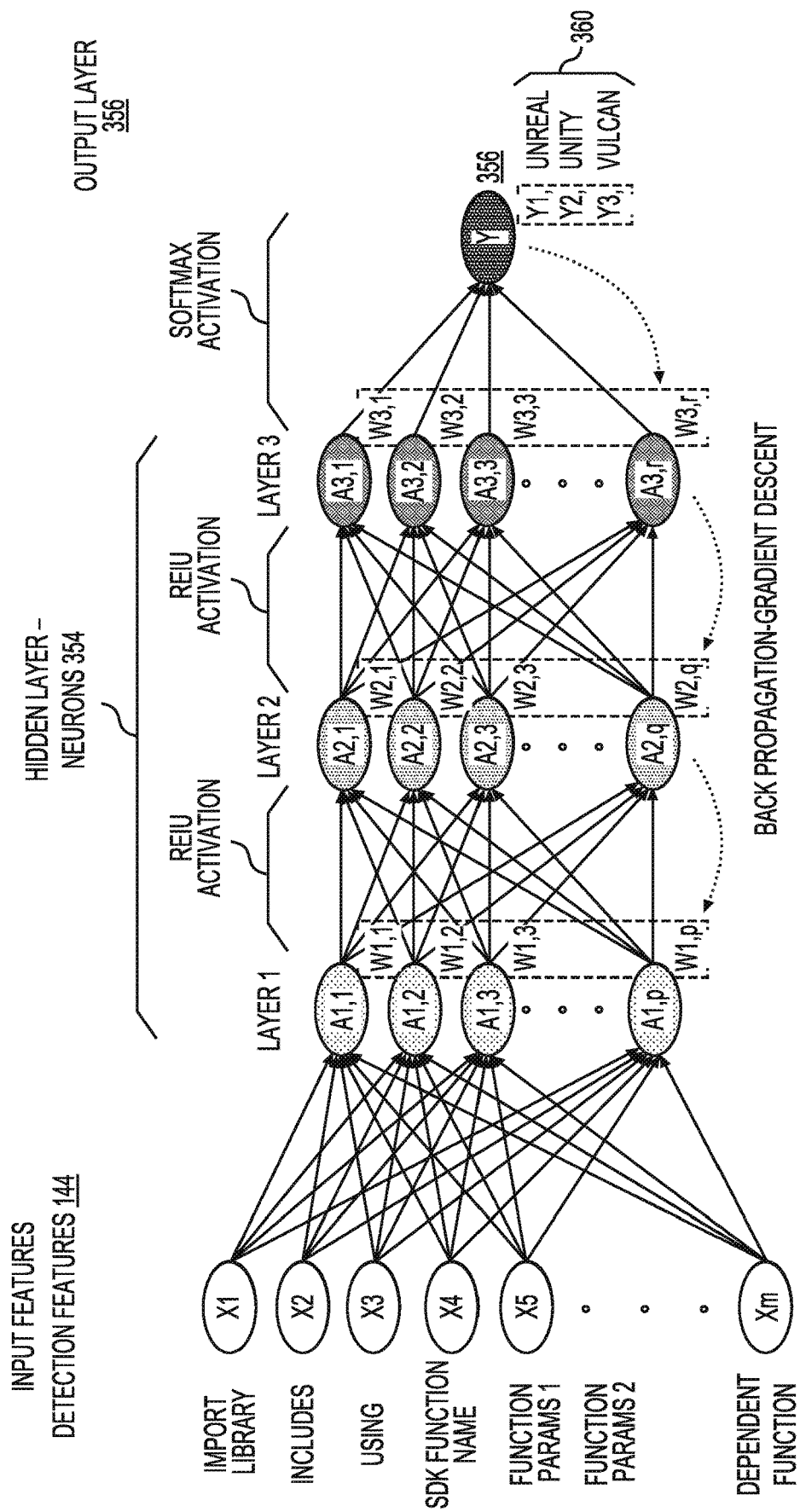
FIG. 3B shows an example of a neural network architecture that can be used for library detection and platform detection in accordance with the examples disclosed herein.

FIG. 3B shows an example of a neural network architecture that can be used for the library detector 302 and the platform detector 304 in accordance with the examples disclosed herein. The input features or the detection features 144, X1, X2, X3, . . . such include but are not limited to, the import libraries, 'include' statements, 'using' statements, the SDK function names, the various function parameters, the dependent functions, etc. Initial weights are assigned to input features based on functionality. The language detection ML model 322 and the platform detection ML model 324 trained for library and platform detection may include at least three hidden layers or neurons 354 with RelU activation between layers. In an example, a gradient descent algorithm can be applied to learn the weights for the hidden layers. In an example, SoftMax activation can be applied at the output layer 356 to enable multi-class classification of the library based on different confidence scores. The output 360 for library detection is illustrated for gaming code, wherein one of the libraries from Unreal, Unity, and Vulcan may be detected. Similar input features/detection features 144 as used for library detection can be applied with different output labels to train an ML model for platform detection. Further, the threshold values can be adjusted to detect the game engine/library and the source platform 152. The ML model algorithm is shown below:

$$Z=W \cdot X+b \qquad \text{Eq. (1)}$$

$$A=\text{Rel}U(Z); \qquad \text{Eq. (2)}$$

$$A=\text{SOFTMAX}(Z) \qquad \text{Eq. (3)}$$

where Cost Function is $$L(A, Y) = -Y \cdot \text{Log}(A) - (1-Y) \cdot \text{Log}(1-A) \qquad \text{Eq. (4)}$$

$$J = \frac{1}{m}\sum_{i=0}^{m} L(A, Y) \qquad \text{Eq. (5)}$$

and Backward Propagation is given as:

$$\frac{\partial J}{\partial w} = \frac{1}{m} X \cdot (A-Y)^T \qquad \text{Eq. (6)}$$

$$\frac{\partial J}{\partial b} = \frac{1}{m} \sum_{i=0}^{m} (a^i - y^i) \qquad \text{Eq. (7)}$$

where the update weights are:

$$\theta = \theta - \propto \cdot d\theta \qquad \text{Eq. (8)}$$

where:
X is the input data matrix of the code metadata,
W is the weights matrix at hidden layers,
RelU is the Rectified Linear Activation Function at the hidden layers,
SOFTMAX is the Softmax Activation at the output layer,
Cost Function includes logistic regression,
Backpropagation includes Gradient Descent Function,
θ is the change in weights, and
$\propto$ is the learning rate hyperparameter.

Different data sources are used for generating the training data for the library detection ML model 322 and the platform detection ML model 342. In an example, the training data can include code from various proprietary, private or open-source code repositories, the SDK documentation of various platforms and libraries of different programming languages, and comments from the source programming code 150. The data sources can be processed via natural language processing (NLP) for extraction of the parameters for the ML models. In addition, subject matter expert (SME) inputs are also obtained to generate labeled training data to train the ML models for language/library and platform detections. Although input parameters may be similar for the library and platform detections, the output labels can be different.

FIG. 3C shows a table of the various clusters that can be created by the cluster generator 306 in accordance with the examples disclosed herein. The source programming code modules/snippets are clustered based on the functional features 146. Different source code modules executing the same functionality from different categories 362 may be grouped into the same cluster. For example, source code modules related to both in-game and external chats can be grouped into the chat cluster. Similarly, other clusters of source code modules from different categories including store/virtual goods, audio, user input, video, user setting, game files, and game engine are generated. When provided to the node recommender 308, the clusters are used to generate node recommendations 314 as shown. For example, the chat, audio, and game files clusters are recommended to be hosted on the cloud while the user input and user settings clusters are recommended to be hosted on the client device, etc.

Figure 4:
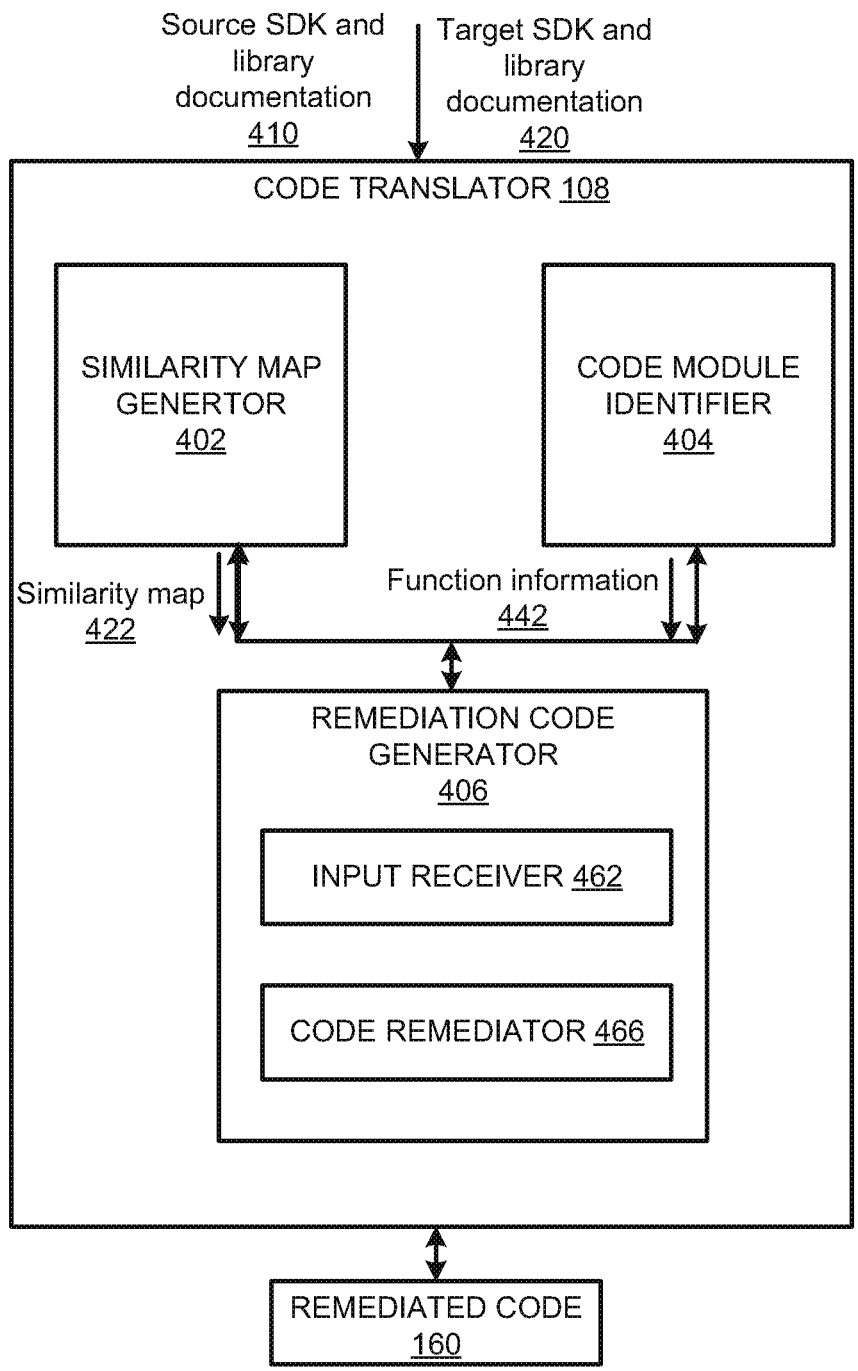
FIG. 4 shows a block diagram of a code translator in accordance with the examples disclosed herein.

FIG. 4 shows a block diagram of the code translator 108 in accordance with the examples disclosed herein. The code translator 108 receives the output from the library detector 302, and the platform detector 304 identifying the programming language used in the source programming code 150 and the source platform 152 and transforms/translates the source programming code 150 into remediated code 160 that can be executed on the target platform 162. The code translator 108 includes a similarity map generator 402, a code module identifier 404, and a remediation code generator 406. The similarity map generator 402 access the source Software Development Kit (SDK) and library documentation 410 of the source platform 152 (based on the predictions from the library detector 302 and the platform detector 304) and the target SDK and library documentation 420 of the target platform 162 and generates a similarity map 422 of the functions. In an example, the similarity map generator 402 employs Natural Language Processing (NLP) techniques to analyze the content of the SDK and library documentation of the source platform 152 and the target platform 162 to cluster similar functions together. Referring to the game programming code transformation, similar function groups can include different groups of different functionalities so that one group may include in-game notification functions from the SDKs and library documents of the source language and platform 152 and the target language and the target platform 162, while another group of similar functions may include the game rendering functions from both the platforms. In an example, the code module identifier 404 can analyze the comments in the source programming code 150 to identify function information 442 of particular code modules/snippets.

The remediation code generator 406 can include an input receiver 462, a code remediator 466. The input receiver 462 can access the function information 442 and the similarity map 422. The code remediator 466 uses the function information 442 and the similarity map 422 to identify the functions of the source SDK and library documentation 410 that need to be replaced by the functions of target SDK and library documentation 420. For example, the functionality of a SceneRender( ) function from the source SDK may be provided by a viewRender( ) function in the target SDK. The best fit functions of the target library corresponding to the source functions/code modules in the source programming code 150 are identified and the source functions/code modules are substituted/replaced with the name of a function performing similar operations from the target SDK and library documentation 420 to make the transformed/remediated code 160 compatible with the target platform 162.

Figure 5:
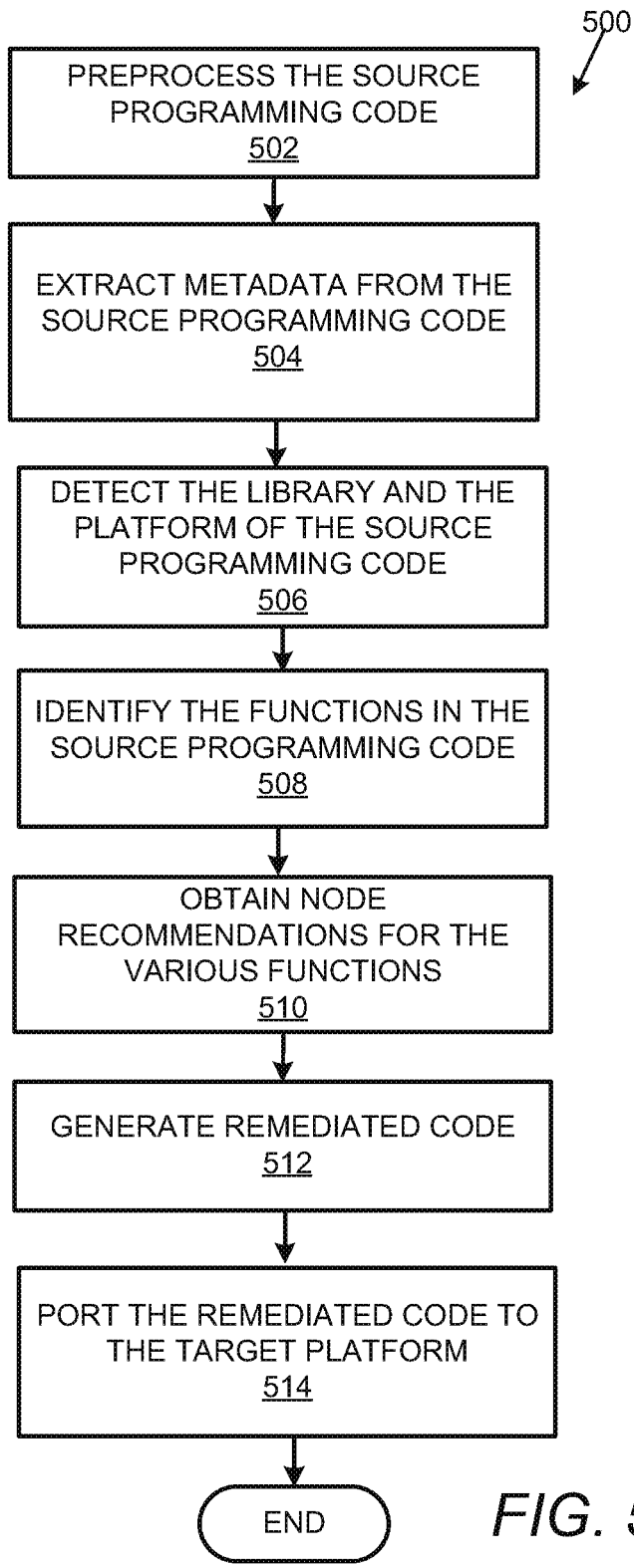
FIG. 5 shows a flowchart that details a method of transforming programming code in accordance with the examples disclosed herein.

FIG. 5 shows a flowchart 500 that details a method of transforming programming code in accordance with the examples disclosed herein. The method begins at 502 wherein the source programming code 150 is preprocessed. In an example, the source programming code 150 can be received as a binary code or an executable. If it is received as a binary code, no preprocessing is required. However, if the source programming code 150 is received as an executable then the executable is decompiled at 502. At 504, the metadata 142 is extracted using ML techniques by treating every line of the source programming code 150 as textual data that can be processed using NLP techniques. The metadata 142 includes the detection features 144 that enable automatic detection of the source language/library and the source platform 152 for which the source programming code was developed. The metadata also includes the functional features 146 that enable automatic detection of the functionality of different source code modules in the source programming code 150. At 506, the source language and the source platform 152 are detected using trained ML models. The source language/library of the source programming code 150 can be detected by providing the detection features 144 to the language detection ML model 322 while the source platform 152 can be detected by the platform detection ML model 342. At 508, the various functions of the different source code modules/snippets in the source programming code 150 are detected. In an example, the comments in the source code modules can be used to identify the functionality associated therewith. At 510, a corresponding node from the plurality of nodes 182-1, 182-2, . . . 182-n, is identified for hosting or executing each of the different source code modules. At 512, the remediated code 160 is generated for the target platform 162 and the remediated code is ported to the target platform at 514.

Figure 6:
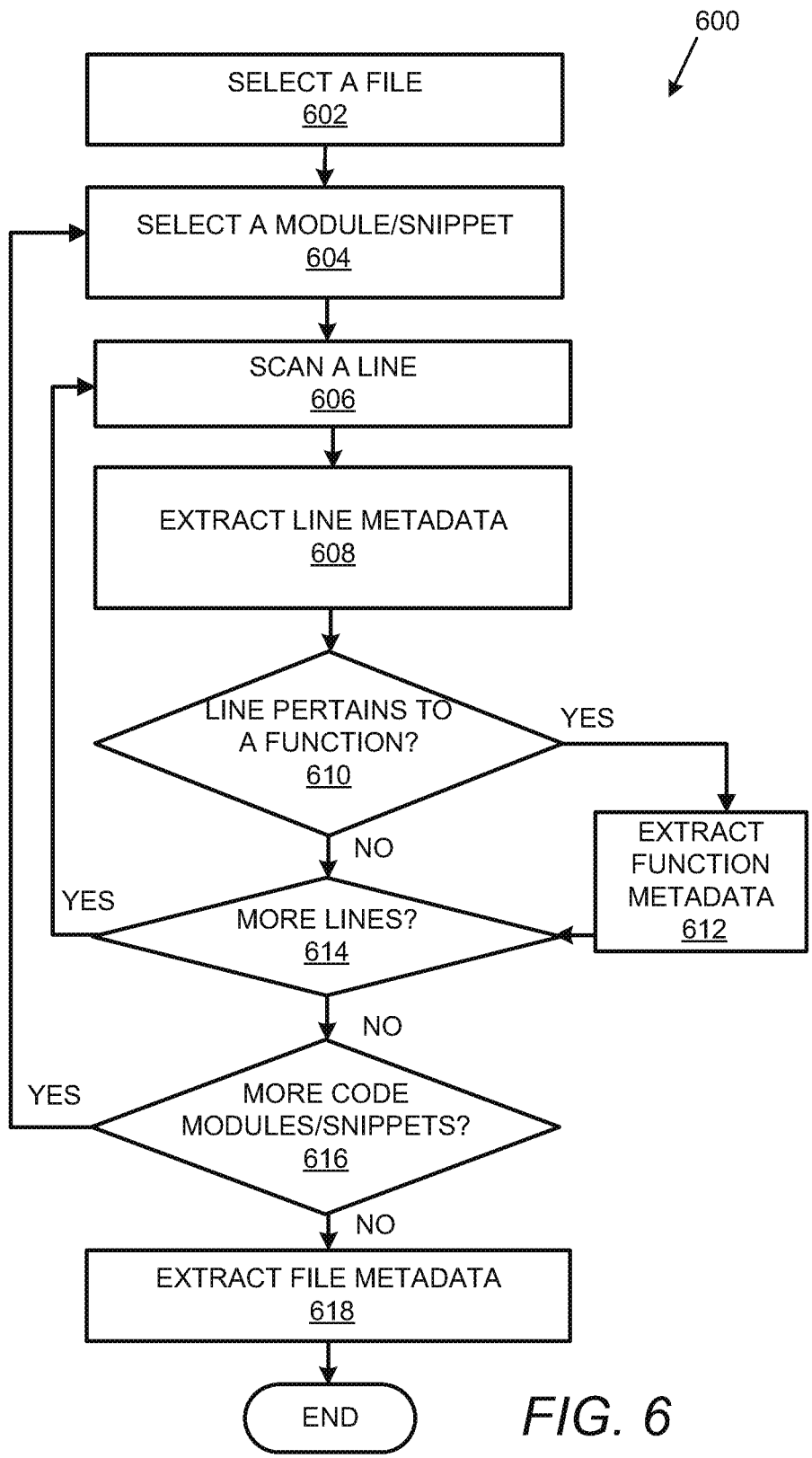
FIG. 6 shows a flowchart that details a method of extracting the metadata from a source programming code in accordance with the examples disclosed herein.

FIG. 6 shows a flowchart that details a method of extracting the metadata 142 from the source programming code 150 in accordance with the examples disclosed herein. The method of extracting the metadata 142 begins at 602 wherein a file may be selected from the source programming code 150. At 604, a code module/snippet is selected from the file and a line is scanned from the file at 606. The metadata of the line is extracted at 608. In an example, the contents of the line are treated as text data and NLTK techniques such as bi-grams, n-grams, for identifying text and special characters can be used for the metadata extraction described herein. The line metadata can include but is not limited to, metadata identifying if the line is an assignment, a condition, a loop, a declaration, a line termination, etc. Upon extracting the line metadata, it can be determined at 610 if the line pertains to the function. In an example, if the line is classified as a function declaration, or the name for a function declaration so that it is part of the function body, the line may be classified as a function. If the line is classified as a function the function metadata is extracted from the line at 612. The function metadata can include but is not limited to the function parameters, the function initialization, the return values, etc. If the line is not classified as a function the method moves directly to 614 from 610 to determine if further lines remain to be processed. If yes, the method returns to 606, to scan the next line. If no more lines remain to be processed in the selected module, the method moves to 616 to determine if further modules remain to be processed. If yes, the method returns to 604 to select the next code module/snippet. If it is determined at 616 that no more code modules remain to be processed, the method moves to 618 to extract the file metadata which can include but is not limited to file imports, global files, etc. The code characteristics of the source programming code 150 are thus extracted irrespective of the programming language. The language detection can enable determining the compatibility of the libraries between the source platform 152 and the target platform 162. The metadata 142 thus extracted can be divided into detection features 144 and functional features 146. There may be overlaps between the two types of features.

Figure 7:
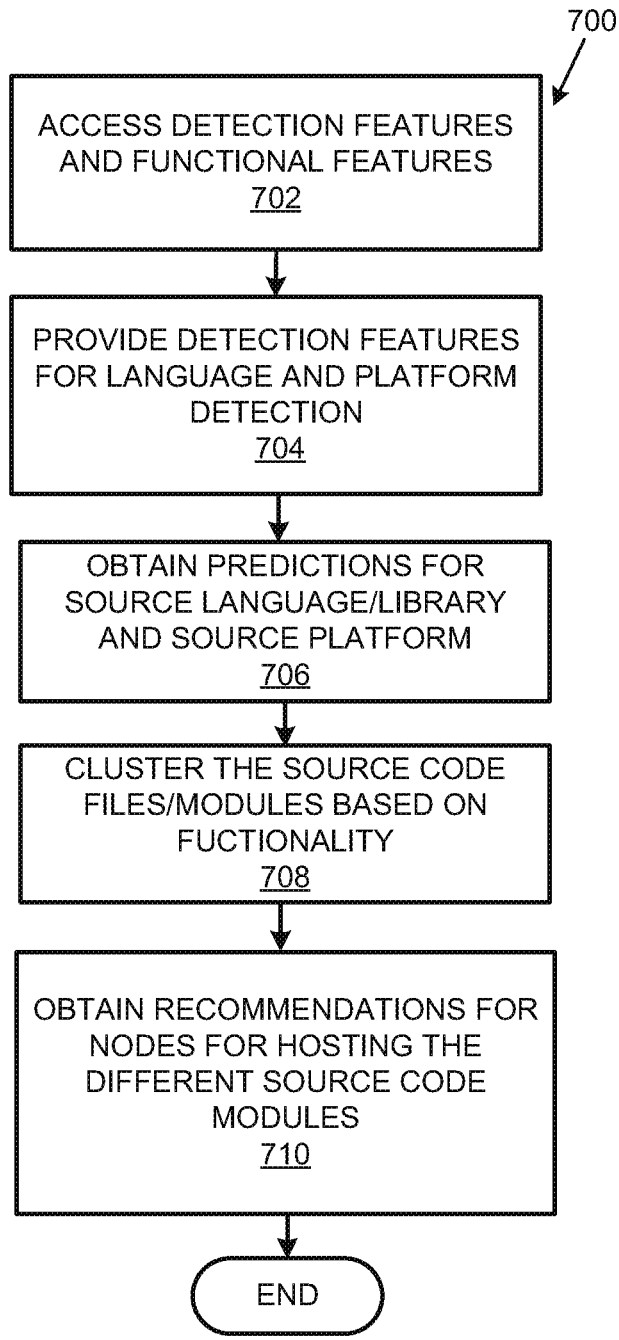
FIG. 7 shows a flowchart that details a method of classifying the source programming code in accordance with the examples disclosed herein.

FIG. 7 shows a flowchart that details a method of classifying the source programming code 150 based on the features and identification of the nodes hosting the specific source code modules in accordance with the examples disclosed herein. The method begins at 702 wherein the detection features 144 and the functional features 146 are accessed. The detection features 144 are provided to the language detection ML model 322 and the platform detection ML model 342 for language detection and platform detection at 704. In an example, different subsets of the detection features 144 may be provided as input parameters for the language and the library detection, to each of the language detection ML model 322 and the specialized library detection ML model 324. Similarly, another subset of the detection features 144 can be provided as input parameters to the platform detection ML model 342 for platform detection. There may be certain detection features that are commonly used as input parameters for both language, library detection, and platform detection. For the game programming code, language detection can include identifying the programming language such as but not limited to C, C+, etc. while the/libraries such as but not limited to, Unity®, Unreal®, Vulcan® can be identified. Platform detection can include source platform identification from platforms such as but not limited to Xbox®, Playstation®, Nintendo®, etc., which can be identified by the platform detection ML model 342.

At 706, the language detection ML model 322 and the platform detection ML model 342 produce respective outputs including the predicted language/library of the source programming code 150. At 708, the functional features 146 can be employed to cluster the source code files/snippets/modules in the source programming code 150 in accordance with the corresponding functions. Based on the functions executed by each of the source code files/snippets/modules in the source programming code 150, recommendations for nodes selected from the plurality of nodes 182-1, 182-2, . . . ,182-n, for executing the corresponding source code modules are obtained at 710.

Figure 8:
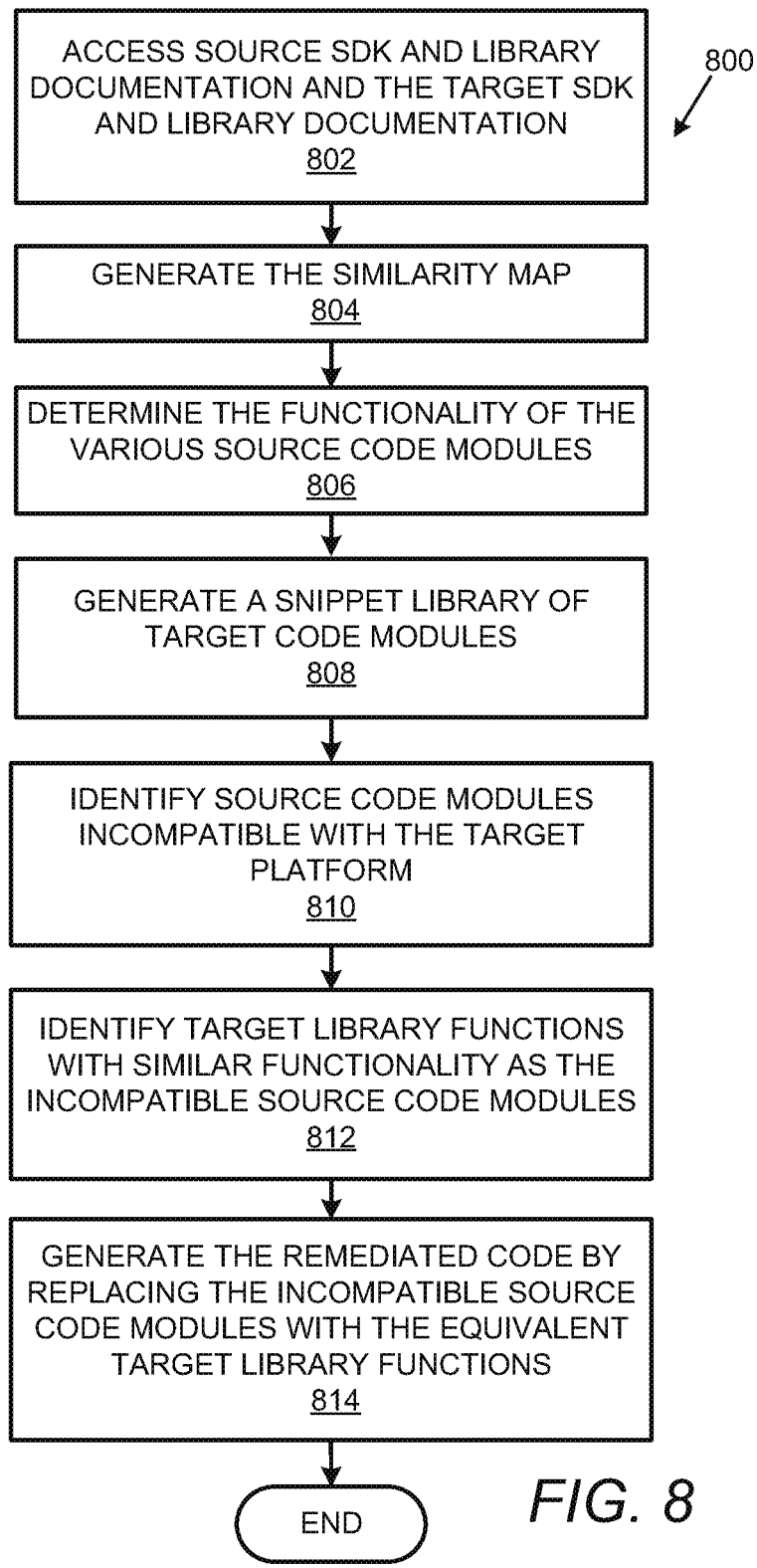
FIG. 8 shows a flowchart that details a method of generating the remediated code in accordance with the examples disclosed herein.

FIG. 8 shows a flowchart 800 that details a method of generating the remediated code in accordance with the examples disclosed herein. The method begins at 802 wherein the source SDK and library documentation 410 and the target SDK and library documents 420 are accessed. The similarity map 422 is generated at 804 between the source SDK and library documentation 410 and the target SDK and library documents 420. At 806, the functionality of the various source code modules is determined based at least on analysis of the comments in the source programming code 150 using NLP techniques of tokenization, parsing, and text recognition models to identify textual data. In an example, the functionality of the various source code modules can also be determined from the clusters 312 generated based on the functionality. Clustering based on functionality is bi-directional and can have a many-to-many relationship. One file can belong to multiple clusters. One cluster can have multiple files. If a source code module belongs to multiple clusters, different portions of the code may have been responsible to be clustered as such. A snippet library of target code modules is created at 808 for common actions/functionality from the similarity map 422. At 810, the source code modules that are incompatible with the target platform 162 can be identified.

The incompatibility of source code modules against the target platform lies in the fact that the SDK function names, the game library function names in the source library may not have a one-to-one mapping or same function name in the target SDK or gaming library that is compatible with the target cloud platform. Though the different gaming libraries individually perform the graphics functionality, their internal architecture, modularization may be entirely different. Going through the SDK documentation, library documentation, and other sample code can help determine the appropriate functions, the function I/O parameters required to invoke the graphics functionality. In an example, ML techniques can be used to create a Similarity Mapping of SDK and Game Library functions based on the described functionality in the documentation. The similarity map 422 can aid in determining if function names and/or input parameters need to be altered in order to make the code executable or compatible with the target library/platform. Thus, the lines/functions/files that are incompatible with the target platform are identified. The source function calls can be replaced with the target function signature (name, calling convention, parameters, return variables, etc.) with a predefined code snippet stored in the repository.

At 812, the target library functions that are most similar in functionality to the incompatible source code modules are identified using the similarity map 422. At 814, the remediated code 160 is generated by replacing the incompatible source code modules with the equivalent target library functions from the snippet library. In an example, a target code module to replace as an incompatible source code module can be identified from the similarity map 422 as the target code module having the highest similarity with the incompatible source code module.

In an example, a use case for the code transformation system 100 can include converting a stand-alone game to a cloud-based game wherein the source programming code 150 is the code for the standalone game that is to be transformed into the remediated code 160 of a cloud-based game for a target language to be implemented on the target platform 162 i.e., the cloud platform. In addition to detecting the source language and the source platform by the language detection ML model 322 and the platform detection ML model 342, different clusters can be generated. By way of illustration and not limitation, a first cluster of the different source code modules implementing core game logic, a second cluster of the different source code modules that render the standalone game, a third cluster of the different source code modules implementing in-game messaging and in-game purchases, and a fourth cluster of the source code modules implementing settings and player preferences can be generated. The node recommender 308 can recommend, a cloud gaming server from the plurality of nodes 182-1, 182-2, ..., 182-n from the communication network 180, for hosting at least the first cluster and the second cluster, a web server for hosting at least the third cluster and a client device for hosting the fourth cluster. Thus, the code transformation system 100 not only transforms/translates code of the stand-alone game from one source language/source platform to the target language/target platform of the cloud gaming system but also identifies network nodes in the cloud gaming environment to host the various code modules for optimal user experience.

Figure 9:
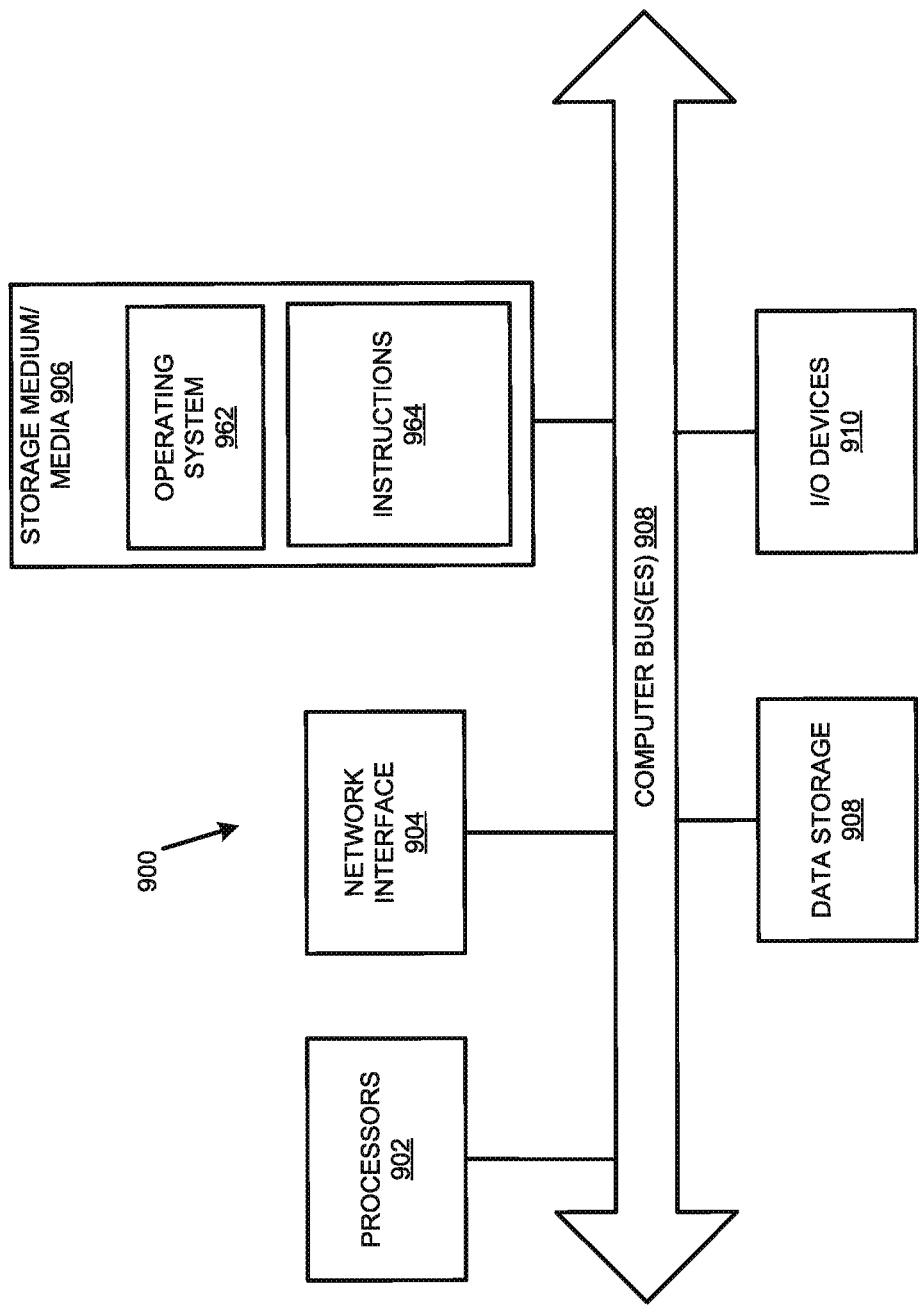
FIG. 9 illustrates a computer system that may be used to implement the ML-based code transformation system according to some examples disclosed herein.

FIG. 9 illustrates a computer system 900 that may be used to implement the code transformation system 100 in accordance with the examples disclosed herein. More particularly, computing machines such as desktops, laptops, smartphones, tablets, and wearables which may be used to generate or access the data from the code transformation system 100 may have the structure of the computer system 900. The computer system 900 may include additional components not shown and some of the process components described may be removed and/or modified. In another example, a computer system 900 can sit on external-cloud platforms such as Amazon Web Services, AZURE® cloud or internal corporate cloud computing clusters, or organizational computing resources, etc.

The computer system 900 includes processor(s) 902, such as a central processing unit, ASIC or another type of processing circuit, input/output devices 910, such as a display, mouse keyboard, etc., a network interface 904, such as a Local Area Network (LAN), a wireless 802.11x LAN, a 3G, 4G or 9G mobile WAN or a WiMax WAN, and a processor-readable storage medium 906. Each of these components may be operatively coupled to a bus 908. The processor-readable or computer-readable medium 906 may be any suitable medium that participates in providing instructions to the processor(s) 902 for execution. For example, the processor-readable medium 906 may be a non-transitory or non-volatile medium, such as a magnetic disk or solid-state non-volatile memory, or a volatile medium such as RAM. The instructions or modules stored on the processor-readable medium 906 may include machine-readable instructions 964 executed by the processor(s) 902 that cause the processor(s) 902 to perform the methods and functions of the code transformation system 100.

The code transformation system 100 may be implemented as software or machine-readable instructions stored on a non-transitory processor-readable medium and executed by one or more processors 902. For example, the processor-readable medium 906 may store an operating system 962, such as MAC OS, MS WINDOWS, UNIX, or LINUX, and code/instructions 964 for the code transformation system 100. The operating system 962 may be multi-user, multi-processing, multitasking, multithreading, real-time, and the like. For example, during runtime, the operating system 962 is running and the code for the code transformation system 100 is executed by the processor(s) 902.

The computer system 900 may include a data storage 908, which may include non-volatile data storage. The data storage 908 stores any data used by the code transformation system 100. The data storage 908 may be used as the data storage 170 to store the metadata 142, the clusters 312, the similarity map 422, and other data elements which are generated and/or used during the operation of the code transformation system 100.

The network interface 904 connects the computer system 900 to internal systems for example, via a LAN. Also, the network interface 904 may connect the computer system 900 to the Internet. For example, the computer system 900 may connect to web browsers and other external applications and systems via the network interface 904.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. A machine learning (ML) based code transformation system, comprising:
   at least one processor;
   a non-transitory processor-readable medium storing machine-readable instructions that cause the processor to:
   extract metadata from a source programming code of a source language encoded for a source platform,
      wherein the source programming code is to be transformed into remediated code of a target language for a target platform, and
      wherein the metadata includes detection features that enable automatic detection of a source library and the source platform and functional features that enable automatic detection of functions of different source code modules in the source programming code;
   detect the source library of the source programming code by providing the detection features to a specialized library detection machine learning (ML) model;
   identify the source platform of the source programming code by providing the detection features to a platform detection ML model;
   cluster the different source code modules based on the functional features;
   determine, via a node recommender model, a corresponding node from a plurality of nodes for hosting the different source code modules,
      wherein the corresponding node is determined from the clustering of the different source code modules based on the functional features;
   identify at least one of the different source modules incompatible with at least one of a target library and the target platform; and
   generate the remediated code for the target platform by replacing the at least one incompatible source module with a similar target code module based on a similarity map of the source library and target library.

2. The ML-based code transformation system of claim 1, wherein to extract the metadata from the source programming code, the processor is to further:
   decompile an executable file including the source programming code.

3. The ML-based code transformation system of claim 1, wherein to extract the metadata from the source programming code, the processor is to further:
   extract one or more of keywords, software development kit (SDK) functions used, and line terminations by applying natural language processing (NLP) techniques to lines of the source programming code.

4. The ML-based code transformation system of claim 3, wherein the NLP techniques include applying natural language tool kit (NLTK) including bi-grams and n-grams that identify text and special characters.

5. The ML-based code transformation system of claim 1, wherein the detection features include language-specific keywords, variables, loops and conditions, declarations, line terminations, function beginnings and endings, initializations, and declarations.

6. The ML-based code transformation system of claim 1, wherein the specialized library detection ML model includes a multi-class classification model.

7. The ML-based code transformation system of claim 6, wherein the classification model includes one of support vector machine (SVM) and logistic regression.

8. The ML-based code transformation system of claim 1, wherein the platform detection ML model includes one of support vector machine (SVM) and logistic regression.

9. The ML-based code transformation system of claim 1, wherein the source programming code is a game application and the functional features include game rendering, game states, player groups, notifications, and payments.

10. The ML-based code transformation system of claim 1, wherein to cluster the functional features, the processor is to further:
    cluster the different source code modules based on the functional features using K-means clustering technique.

11. The ML-based code transformation system of claim 1, wherein the similarity map includes mappings based on similarities between source functions of the source libraries and the target code modules of the target libraries and wherein the plurality of nodes include a cloud server, an edge node, and a client device.

12. The ML-based code transformation system of claim 11, wherein to determine the corresponding node from the plurality of nodes for hosting the target functions, the processor is to:
    provide the clustered source code modules to the node recommender model
       wherein the node recommender model is trained to recommend one of the plurality of nodes for each of the target functions; and
    obtain the corresponding node from the plurality of nodes as an output of the node recommender model.

13. The ML-based code transformation system of claim 1, wherein to generate the remediated code in the target language, the processor is to:
    identify the similar target code module from the one or more target libraries in the similarity map having a highest similarity with the at least one incompatible source module.

14. A method of code transformation, comprising:
    extracting metadata of a source programming code encoded in a source language for a source platform,
       wherein the source programming code is a standalone game that is to be transformed into remediated code of a cloud-based game in a target language to be implemented on a cloud platform, and
       wherein the metadata includes detection features and functional features;
    detecting the source language and at least one source library of the source programming code by providing the detection features from the metadata to a language detection machine learning (ML) model and a specialized library detection ML model;
    detecting the source platform of the source programming code by providing the detection features to a platform detection ML model;
    clustering different source code modules of the source programming code based at least on the functional features;
    selecting by a node recommender model, a corresponding node from a plurality of nodes of a communication network to host each of the different source code modules;
    generating a similarity map between source documentation and target documentation of the target platform;

identifying one or more of the different source code modules that are incompatible with the target platform;

generating the remediated code by replacing the one or more incompatible source code modules with similar target code modules selected from the similarity map; and porting the remediated code to be hosted on the corresponding nodes of the plurality of nodes that were selected to host similar source code modules.

15. The method of claim 14, wherein the plurality of nodes includes at least a cloud gaming server, a web server, and a client device.

16. The method of claim 15, wherein clustering the different source code modules further comprises:

generating a first cluster of the different source code modules implementing core game logic, a second cluster of the different source code modules that render the standalone game, a third cluster of the different source code modules implementing in-game messaging and purchases, and a fourth cluster of the source code modules implementing settings and player preferences.

17. The method of claim 16, wherein selecting the corresponding node to host each of the different source code modules further comprises:

selecting, by the node recommender model, the cloud gaming server from the plurality of nodes for hosting at least the first cluster and the second cluster and the webserver from the plurality of nodes for hosting at least the third cluster.

18. The method of claim 16, wherein selecting the corresponding node to host each of the different source code modules further comprises:

selecting, by the node recommender model, the client device for hosting the fourth cluster.

19. A non-transitory processor-readable storage medium comprising machine-readable instructions that cause a processor to:

extract metadata of a source programming code of a source language encoded for a source platform, wherein the source programming code is to be transformed into remediated code of a target language for a target platform, and wherein the metadata includes detection features and functional features;

detect the source language and at least one source library of the source programming code by providing the detection features from the metadata to a language detection machine learning (ML) model and a specialized library detection ML model;

detect the source platform of the source programming code by providing the detection features to a platform detection ML model;

cluster different source code modules from the source programming code based at least on functionality implemented by the different source code modules;

select a corresponding node from a plurality of nodes of a communication network to host each of the different source code modules;

generate a similarity map between source documentation and target documentation;

identify one or more of the different source code modules that are incompatible with the target platform;

generate the remediated code by replacing the one or more incompatible source code modules with corresponding target code modules selected from the similarity map; and port the remediated code to be hosted on the corresponding nodes of the plurality of nodes that were selected to host the different source code modules.

20. The non-transitory processor-readable storage medium of claim 19, comprising further machine-readable instructions that cause the processor to:

train the language detection ML model via supervised learning with explicitly labeled training data that includes an identifier of the source language and line metadata, function metadata and file metadata of the source programming code; and train the platform detection ML model via supervised learning with explicitly labeled training data that includes an identifier of the source platform and the line metadata, the function metadata, and the file metadata of the source programming code.

* * * * *